(12) United States Patent
Ryf et al.

(10) Patent No.: US 8,867,125 B2
(45) Date of Patent: Oct. 21, 2014

(54) MULTI-MODE OPTICAL FIBER AMPLIFIER

(71) Applicant: Alcatel-Lucent USA Inc., Murray Hill, NJ (US)

(72) Inventors: Roland Ryf, Aberdeen, NJ (US); Nicolas K. Fontaine, Keyport, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/632,038

(22) Filed: Sep. 30, 2012

(65) Prior Publication Data
US 2014/0055843 A1 Feb. 27, 2014

Related U.S. Application Data

(60) Provisional application No. 61/692,735, filed on Aug. 24, 2012.

(51) Int. Cl.
*H01S 3/067* (2006.01)

(52) U.S. Cl.
USPC .................................. 359/341.1; 359/337

(58) Field of Classification Search
USPC ............................... 359/341.1, 337
See application file for complete search history.

(56) References Cited

U.S. PATENT DOCUMENTS

| | | | | |
|---|---|---|---|---|
| 6,626,592 | B2 * | 9/2003 | Watanabe | 398/150 |
| 2010/0329670 | A1 * | 12/2010 | Essiambre et al. | 398/43 |
| 2011/0279888 | A1 * | 11/2011 | Fini et al. | 359/334 |
| 2012/0183304 | A1 * | 7/2012 | Winzer et al. | 398/142 |

FOREIGN PATENT DOCUMENTS

| | | |
|---|---|---|
| EP | 2365654 A2 | 9/2011 |
| GB | 2310506 A | 8/1997 |
| WO | 2011094400 A2 | 8/2011 |

OTHER PUBLICATIONS

"Efficient optical amplification for spatial division multiplexing", Peter M. Krummrich, Next-Generation Optical Communication: Components, Sub-Systems, and Systems, SPIE, Jan. 21, 2012, vol. 8284, No. 1, pp. 1-7.
International Search Report for PCT/US2013/052490, mailed Dec. 4, 2013, which is a counterpart of this present application.

* cited by examiner

*Primary Examiner* — Mark Hellner
(74) *Attorney, Agent, or Firm* — D. M. LaBruno (57) ABSTRACT

An apparatus includes a multi-core optical fiber and first, second, and third optical couplers. The multi-core optical fiber is rare-earth doped to provide optical amplification in response to optical pumping thereof. The first optical coupler is configured to end-couple a first multi-mode optical fiber to an end of the multi-core optical fiber. The second optical coupler is configured to end-couple a second multi-mode optical fiber to an end of the multi-core optical fiber. The third optical coupler is configured to optically couple a pump light source to the multi-core optical fiber.

26 Claims, 10 Drawing Sheets

MULTI-MODE OPTICAL FIBER AMPLIFIER

This application claims the benefit of U.S. provisional application 61/692,735, which was filed on Aug. 24, 2012 by Nicolas K. Fontaine and Roland Ryf.

BACKGROUND

1. Technical Field

The invention relates generally to an optical amplifiers and methods and apparatus that use optical amplifiers.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

In many optical communication systems, the data-modulated optical carrier undergoes amplification between the optical transmitter and the optical receiver. One type of optical amplification involves conversion of a data-modulated optical carrier from an optical signal to an electrical signal and a re-conversion of a corresponding electrical back to an optical signal. Such a conversion and re-conversion sequence is typically referred to as optical to electrical to optical (OEO) type of signal processing. Another type of optical amplification involves amplification of the data-modulated optical carrier in the optical domain without any type of OEO signal procession. This later type of optical amplification is often referred to as all-optical amplification. All-optical amplification has been performed using pumped rare-earth dopants and using optical waveguides pumped to cause Raman-type optical processes.

In long-distance optical communication systems, OEO and/or all-optical amplification is often needed to compensate for attenuation of the data-modulated optical carrier in passive optical transmission fibers.

SUMMARY OF SOME ILLUSTRATIVE EMBODIMENTS

An embodiment of a first apparatus includes a multi-core optical fiber and first, second, and third optical couplers. The multi-core optical fiber is rare-earth doped to provide optical amplification in response to optical pumping thereof. The first optical coupler is configured to end-couple a first multi-mode optical fiber to an end of the multi-core optical fiber. The second optical coupler is configured to end-couple a second multi-mode optical fiber to an end of the multi-core optical fiber. The third optical coupler is configured to optically couple a pump light source to the multi-core optical fiber.

In some embodiments of the first apparatus, the apparatus may further include one or more optical pump lasers optically connected to the third optical coupler and configured to produce optical amplification in the multi-core optical fiber. In some such embodiments, the third optical coupler is configured to couple an adjacent end face of each optical core of the multi-core optical fiber to a corresponding source of pump light. In any such embodiments, the apparatus may further include a polarization scrambler connected between the one or more optical pumps and the multi-core optical fiber. In any such embodiments, the third optical coupler may be configured to preferentially or predominantly transmit pump light from the one or more pump lasers to a proper subset of nearby end-faces of the optical cores of the multi-core optical fiber.

In any embodiments of the first apparatus, the apparatus may further include an optical attenuator. The optical attenuator is configured to adjust an intensity of light being transmitted between adjacent ends of the multi-core optical fiber and one of the multi-mode optical fibers in a manner non-trivially dependent on an optical propagating mode of the light in the one of the multi-mode optical fibers.

In any embodiments of the first apparatus, the multi-core optical fiber may be a three-core optical fiber in which three optical cores are about equidistant from each other.

In any embodiments of the first apparatus, the multi-core optical fiber may have disjoint first and second sets of optical cores. The first set is formed of one or more optical cores. The second set is formed of an odd number of optical cores distributed on a circle and located around the first set.

An embodiment of a second apparatus includes a series of spans of multi-mode optical fiber and a plurality of all-optical amplifiers. In the series, the spans of multi-mode optical fiber are end-connected to form an all-optical communication line. Each all-optical amplifier end-connects a corresponding adjacent pair of the spans. Each all-optical amplifier includes a multi-core optical fiber doped with a rare-earth element to provide optical amplification in response to being optically pumped.

In some embodiments of the second apparatus, each adjacent pair of the spans may be end-connected by one of the all-optical amplifiers.

In any embodiments of the second apparatus, individual ones of the all-optical amplifiers may include one or more optical pumps connected to optically pump the multi-core optical fibers therein. In some such embodiments, one or more of the all-optical amplifiers may include a polarization scrambler connected between the one or more optical pumps and the multi-core optical fiber therein.

In any embodiments of the second apparatus, one of the all-optical amplifiers may include an optical attenuator configured to attenuate in a manner dependent on an optical propagation mode of the light in one of spans of the corresponding adjacent pair.

In any embodiments of the second apparatus, some of the multi-core optical fibers may have three optical cores located about equidistant from each other.

In some embodiments of the second apparatus, the individual multi-core optical fibers have disjoint first and second sets of optical cores. The first set is formed of one or more of the optical cores, and the second set is formed of an odd number of the optical cores located on a circle and around the first set.

An embodiment of a method includes acts of receiving and amplifying. The act of receiving includes, at an end of a rare-earth doped multi-core optical fiber, receiving a stream of optical signals from a multi-mode optical fiber. The act of amplifying includes amplifying the received stream of optical signals in the rare-earth-doped multi-core optical fiber.

In some embodiments of the method, the method may further include, from an end of the multi-core optical fiber, transmitting the amplified stream of optical signals to a second multi-mode optical fiber.

In any embodiments of the above method, the act of amplifying may include optically pumping the multi-core optical fiber with one or more pump lasers to produce optical amplification therein.

In any embodiments of the method, the method may further include a second act of receiving and a second act of amplifying. The second act of receiving includes, at an end of another rare-earth doped multi-core optical fiber, receiving a stream of optical signals from the other multi-mode optical fiber in response to the act of transmitting. The second act of amplifying includes amplifying the received stream of optical signals in the other rare-earth-doped multi-core optical fiber.

In some embodiments of the method, the method may further include optically attenuating light being communicated between the multi-core optical fiber and one of the multi-mode optical fibers in a manner that nontrivially adjusts intensity based on an optical propagating mode of the light in the one of the multi-mode optical fibers.

BRIEF DESCRIPTION OF THE FIGURES

In the Figures and text, like reference numbers refer to structurally and/or functionally similar elements.

In the Figures, relative dimensions of some features may be exaggerated to more clearly show one or more of the structures being illustrated therein.

Herein, various embodiments are described more fully by the Figures and the Detailed Description of Illustrative Embodiments. Nevertheless, the inventions may be embodied in various forms and are not limited to the specific embodiments that are described in the Figures and Detailed Description of Illustrative Embodiments.

DESCRIPTION OF THE ILLUSTRATIVE EMBODIMENTS

Herein, a multi-mode optical fiber has a single optical core and adjacent optical cladding, which are configured to guide a set of optical propagating modes at optical telecommunications wavelengths. The set includes modes with nontrivially different lateral light intensity profiles, i.e., profiles differing by more than a scale factor. Often, a multi-mode optical fiber is essentially axially symmetric.

Herein, a multi-core optical fiber has a plurality of disjoint optical cores in an optical cladding. In a multi-core-fiber, an individual one of the optical cores and the adjacent optical cladding may guide one or more optical propagating modes. Due to the presence of multiple disjoint optical cores, a multi-core optical fiber is not axially symmetric about an axis of the optical fiber.

Some of the below-described embodiments provide advantageous all-optical fiber amplifiers useable to amplify light of end-coupled multi-mode optical fibers. In various ones of the embodiments, the optical fiber, in which optical amplification occurs, is a multi-core optical fiber. Such multi-core optical fiber may enable improved control of propagation such that the amplifier's optical gain has a lower dependence on the optical propagating mode of the light-to-be-amplified than in some other optical fiber amplifiers.

Figure 1A:
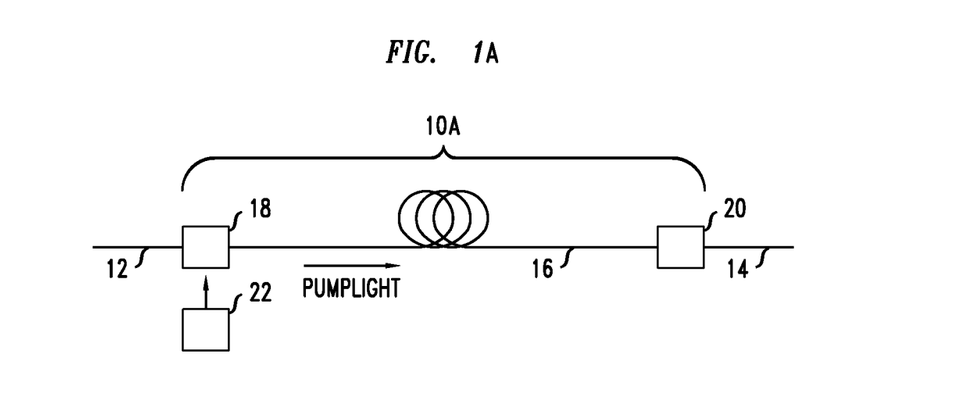
FIGS. 1A, 1B, and 1C are block diagrams schematically illustrating embodiments of optical fiber amplifiers, e.g., rare-earth doped amplifiers, for an optical communication systems in which multi-mode optical fiber (MMF) and optical propagation modes with nontrivially different lateral intensity profiles carry data-modulated optical streams.
Figure 1B:
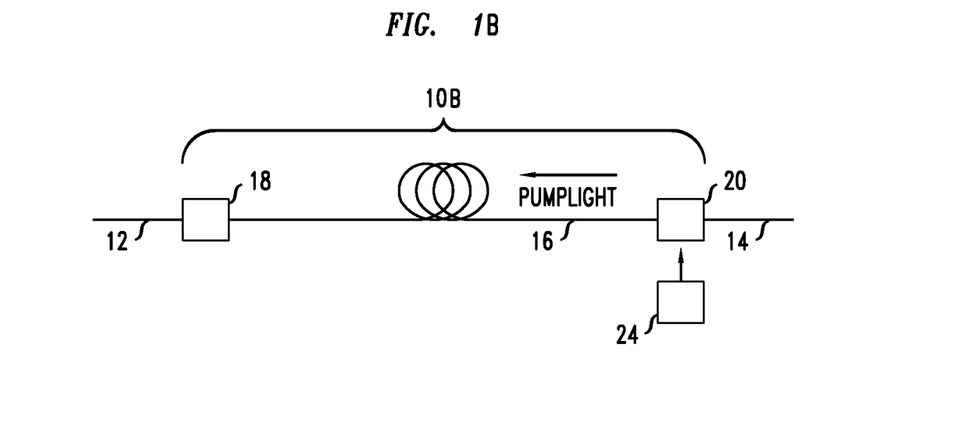
Figure 1C:
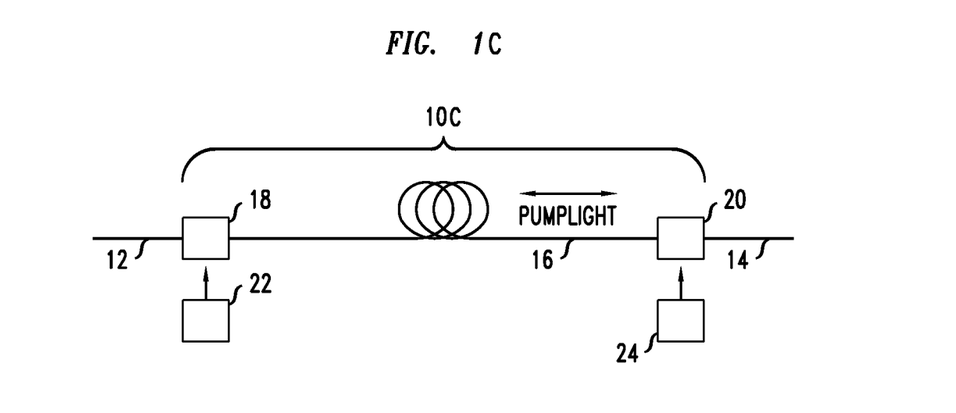

FIGS. 1A-1C illustrate respective first, second, and third embodiments of all-optical amplifiers 10A, 10B, 10C, i.e., rare-earth doped fiber optical amplifiers. Each optical amplifier 10A-10C is configured to receive and amplify light from a set of N corresponding optical propagating modes of an end-coupled input multi-mode optical fiber (MMF) 12. The all-optical amplifiers 10A-10C may be configured to transmit the amplified light to a set of N corresponding optical propagating modes of an end-coupled output MMF 14. Each such set of optical propagating modes that couple to the fiber amplifier includes optical propagating modes with nontrivially different lateral light intensity profiles, i.e., profiles differing by more than a scale factor. The N optical propagating modes of each such set may carry, in parallel, N or less independent data-modulated optical streams, e.g., one stream per mode and per wavelength band. The sets of corresponding optical propagating modes of the input and output MMFs 12, 14 may include the same and/or different optical propagating modes, e.g., $LP_{01}$, $LP_{11}x$, and $LP_{11}y$ modes.

Each of the optical amplifiers 10A-10C includes a multi-core optical amplifier fiber 16 and first and second optical couplers 18, 20. The optical couplers 18, 20 couple the end-faces of the multi-core optical amplifier fiber 16 to the end-faces of the input and/or output MMFs 12, 14 and couple the multi-core optical amplifier fiber 16 to source(s) of forward and/or backwards propagating pump light. Some embodiments of the optical amplifiers 10A-10C may also include forward and/or backwards directed optical pump(s) 22, 24, e.g., laser-light pumps or other suitable pump-light sources for a rare-earth doped optical fiber.

Figure 2:
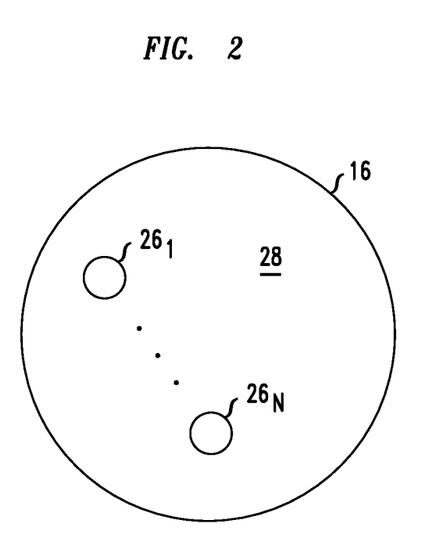
FIG. 2 is a schematic illustration of the cross section of the multi-core optical amplifier fiber shown in FIGS. 1A-1C.

The multi-core optical amplifier fiber 16 has N optical cores $26_1$-$26_N$ embedded in an optical cladding matrix 28 as illustrated schematically in FIG. 2. The integer N is typically greater than or equal to 3. The individual optical cores $26_1$-$26_N$ may have a higher optical refractive index than the optical cladding material 28 so that the individual optical cores $26_1$-$26_N$ may guide light there along. The optical cores $26_1$-$26_N$ are distributed in the optical cladding 28 in a fixed or longitudinally varying lateral pattern, e.g., the pattern may rotate around the axis of the multi-core optical amplifier fiber 16. The optical cores $26_1$-$26_N$ may be sufficiently laterally separated so that each individual optical core $26_1$-$26_N$ has guided mode(s) not substantially overlapping the remaining optical cores $26_1$-$26_N$. Alternatively, the optical propagating modes may substantially overlap more that one of the N optical cores $26_1$-$26_N$.

Alternatively, individual ones of the optical cores $26_1$-$26_N$ may be tubular cores. In such optical cores $26_1$-$26_N$, the optical refractive index has a higher value in a tubular region centered on the axis of a specific optical core $26_1$-$26_N$ than in adjacent portions of the optical cladding matrix. Inside and outside of such tubular regions, the optical refractive index has a lower value, e.g., both regions may have optical refractive indexes of the value of the optical cladding matrix. Within the thickness of such tubular regions, the optical refractive index may be constant or may vary with radial distance from the axis of the tubular region.

The multi-core optical amplifier fiber 16 is doped with one or more types of dopant atoms 28 to support optical amplification in response to optical pumping. For example, the dopant atoms 28 may include rare-earth dopant atoms such as erbium, thulium, praseodymium, and/or ytterbium or another conventionally known dopant for producing optical amplification in response to optical pumping.

The dopant atoms 28 may have various distributions in the multi-core optical fiber 12 in the optical cores $26_1$-$26_N$ and/or in the optical cladding matrix 26. In various embodiments, such dopant atoms 28 may be concentrated in the optical cores $26_1$-$26_N$ and/or in optical cladding regions adjacent thereto. Since the intensity of received light is usually larger in and near the optical cores $26_1$-$26_N$, such limited distributions of the dopant atoms 28 in the multi-core optical amplifier fiber 16 may provide for more efficient optical amplification.

The individual optical cores $26_1$-$26_N$ may be configured and/or located in a lateral pattern in the multi-core optical amplifier fiber 16 to support an efficient end-coupling of the multi-core optical amplifier fiber 16 to a selected set of corresponding optical propagating modes of the MMF(s) 12, 14. In particular, the end-faces of the N optical cores $26_1$-$26_N$ may be situated and aligned to be illuminated by non-trivial patterns of the light signals to-be-amplified, which are received from the input MMF 12. Each non-trivial pattern typically excites a linear combination of relatively orthogonal optical propagating modes in the multi-core optical amplifier fiber 16, e.g., via a non-trivial pattern of light spots. Also, one or more of the end-faces of the N optical cores $26_1$-$26_N$ may be situated and aligned to be illuminated by a pattern of pump light from the optical pump(s) 22, 24, e.g., a pattern of one or more spots of said pump light. The alignment and/or image magnification of such light patterns on the end-face of the multi-core optical amplifier fiber 16 may be selectively set up to reduce optical propagation mode-dependency in the optical gain produced by the optical fiber amplifiers 10A-10C.

Figure 3:
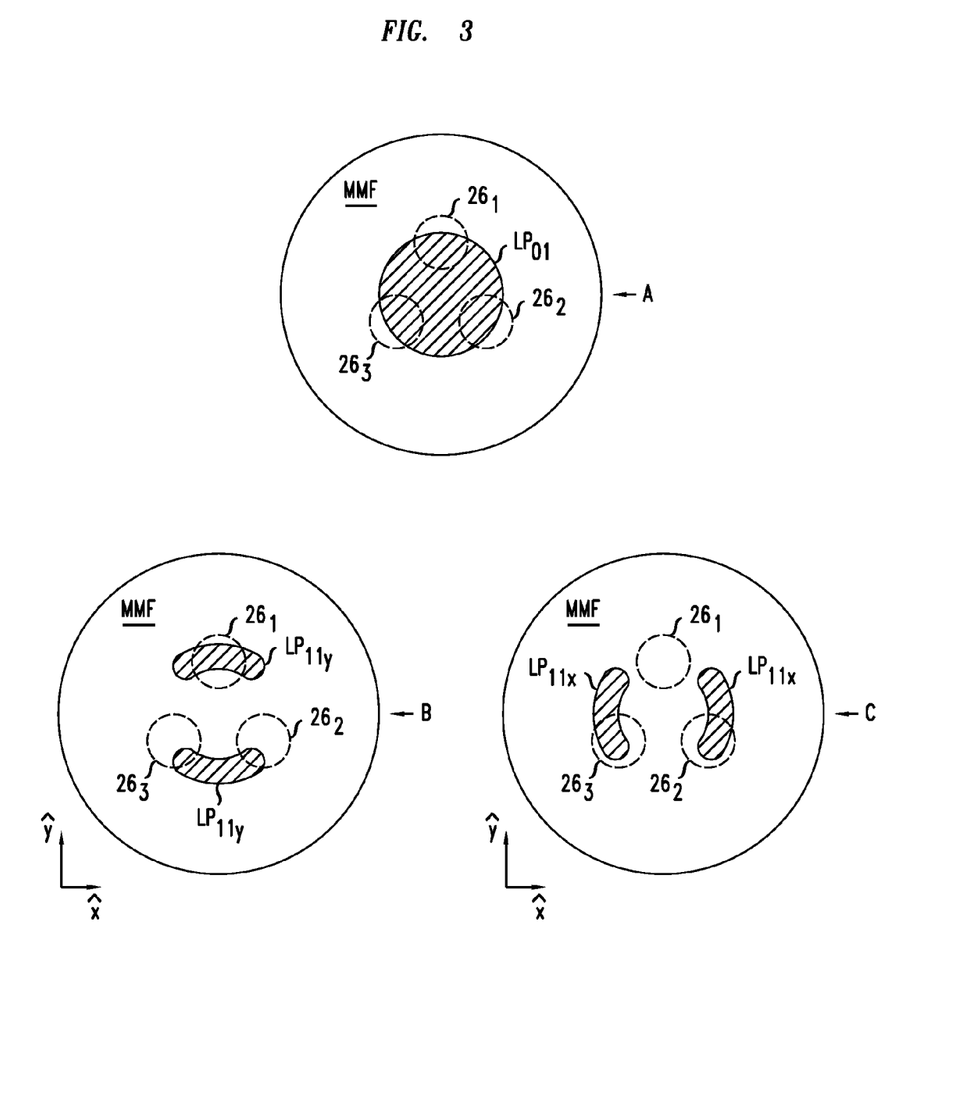
FIG. 3 is a cross-sectional view of an end-face of an example three-core optical amplifier fiber of FIGS. 1A-1C, which qualitatively illustrates the overlaps between optical propagating modes of the three optical cores and optical propagating modes of an end-coupled input or output multi-mode optical fiber (MMF)

A configuration of the three-core optical amplifier fiber 16 that may be optically end-coupled to three corresponding propagating optical modes of a few mode optical fiber (FMF) 12 of low optical index contrast is schematically illustrated in FIG. 3. In this example three-core optical amplifier fiber 16, the optical cores $26_1$-$26_3$ may have about the same diameter and about the same optical refractive indexes and may be about equidistant and symmetrically located about the axis of the three-core optical amplifier fiber 16.

In FIG. 3, lateral intensity profiles of approximate optical propagating modes of the FMF 12, i.e., linearly polarized $LP_{01}$, $LP_{11}y$, and $LP_{11}x$ modes, are schematically illustrated by cross-hatched regions, and the three optical cores $26_1$-$26_3$ are indicated by dashed lines. Each cross-hatched region schematically illustrates a high light intensity region of the corresponding one of the LP modes of the FMF 12 at the end-coupled end-face of the three-core optical amplifier fiber 16. In particular, plates A, B, and C schematically illustrate the high intensity illumination regions on the end-face of the three-core optical amplifier fiber 16 produced by the $LP_{01}$ mode, the $LP_{11}y$ mode, and the $LP_{11}x$ mode, respectively.

Plates A-C illustrate that the optical coupling of individual LP modes of the three-core FMF 12 to the optical cores $26_1$, $26_2$, $26_3$ at the end-face of the multi-core optical amplifier fiber 16 depends on inter-core separations and core-diameters of the optical cores $26_1$-$26_3$. This conclusion qualitatively implies that the optical coupling of the LP modes of the FMF 12 to optical propagating modes guided by the three optical cores $26_1$, $26_2$, $26_3$ should also depend on said inter-core separations and core diameters. Indeed, these dependencies of the optical couplings should typically be mode-dependent. For that reason, some choices for the geometrical parameters defining the three-core optical amplifier fiber 16 may provide a low mode-dependency in the insertion loss with respect to end-coupling of the $LP_{01}$, $LP_{11}y$, and $LP_{11}x$ modes of the FMF 12 to the three-core optical amplifier fiber 16.

In one example, each of the three optical cores $26_1$-$26_3$ has a core-diameter of about 12.4 micro-meters and a core-to-core separation of about 29.4 um and may have a step-index profile with an optical refractive index contrast of about 0.27% with respect to the optical cladding matrix. These values of the core-to-core separation and the core-diameter may, e.g., also be scaled by about the same coefficient to smaller values in some other embodiments of the three-core optical amplifier fiber 16. In addition, a lens system may be used to image light from an output end-face of the FMF 12 onto the input end-face of the three-core optical amplifier fiber 16 with a magnification or a de-magnification that reduces mode-dependent insertion loss.

Figure 4:
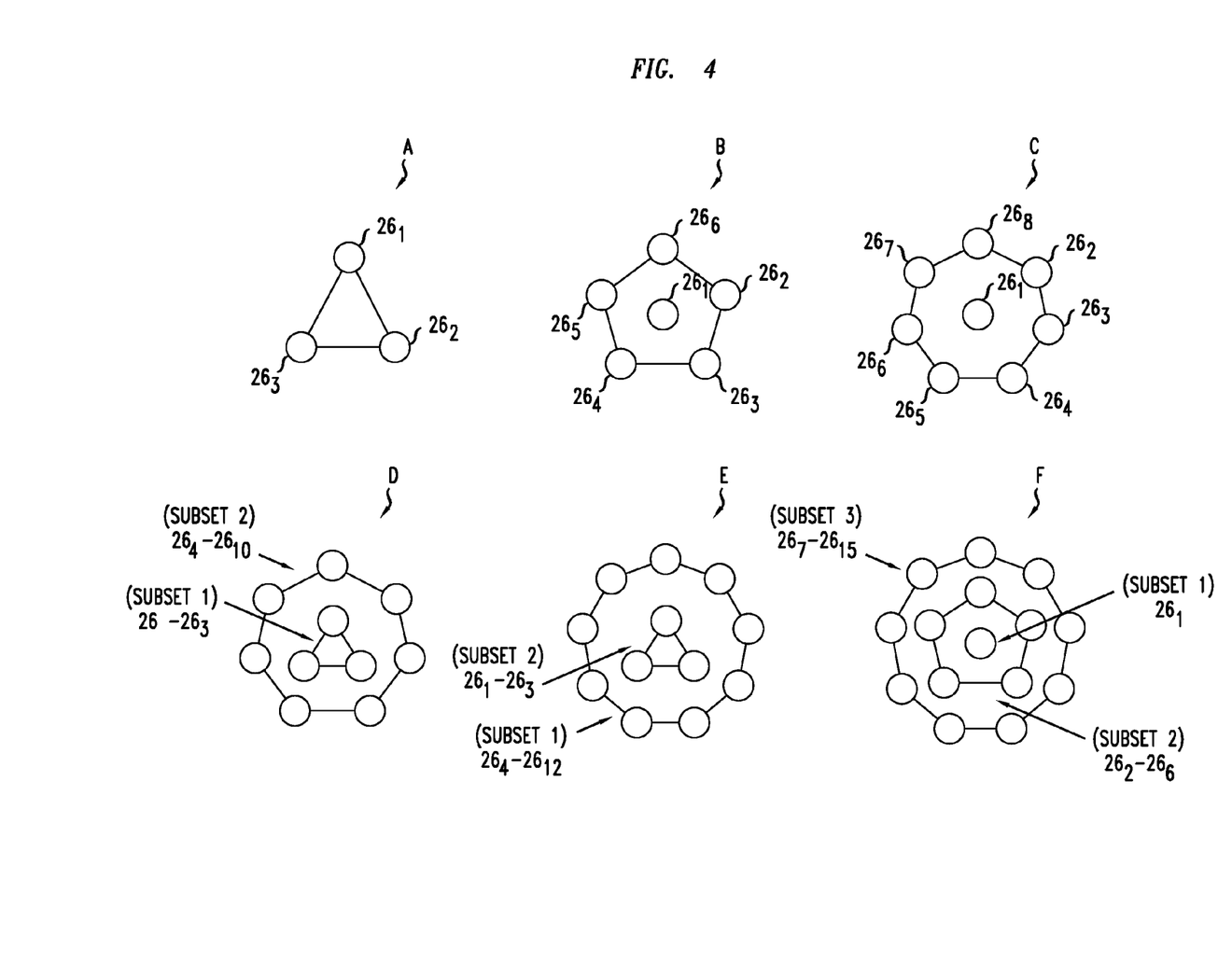
FIG. 4 provides schematic cross-sectional views A-F of end-faces of alternate examples of the multi-core optical amplifier fiber of FIGS. 1A-1C having different numbers of optical cores.

FIG. 4 illustrates special lateral patterns A, B, C, D, E, F for the N optical cores $26_1$-$26_N$ of six examples of the multi-core optical amplifier fiber 16 of optical fiber amplifiers 10A-1C in FIGS. 1A-1C. In these six examples, the N individual optical cores may have about the same sizes, shapes, and optical refractive indexes.

In the special lateral patterns A, B, C, D, E, and F, the multi-core optical amplifier fiber 16 has 3, 6, 8, 10, 12, and 15 respective optical cores $26_1$-$26_N$ whose locations are indicated via circular spots.

FIG. 4 also shows imaginary line segments connecting members of disjoint subsets of the N optical cores $26_1$-$26_N$ of each special lateral pattern A-D. In an individual subset, the member optical cores $26_1$-$26_N$ have a simple geometrical relation in the multi-core amplifier optical fiber 16. The member optical cores optical cores $26_1$-$26_N$ of an individual subset are located at the vertices of an imaginary and approximately regular polygon with an odd number of vertices, i.e., a polygon as indicated by the line segments. Here, a single vertex object is considered a degenerate polygon. In the special lateral patterns. The special lateral patterns B-F have a plurality of such polygons, which are typically about concentric and may be, e.g., centered on an axis of the multi-core optical amplifier fiber 16.

Thus, in the special lateral patterns B-F, there are two or more disjoint subsets of formed by the N optical cores optical cores $26_1$-$26_N$. A first of the subsets is centrally located in the multi-core optical amplifier fiber 16, and one or more other subsets, wherein each such other subset is formed by an odd number of equally spaced optical cores that are arranged along a circle and surround the first subset. In other embodiments, other lateral patterns of the N optical cores $26_1$-$26_N$, wherein the number N is larger, may also have such special forms.

Such special lateral patterns of the N optical cores $26_1$-$26_N$ are believed by the applicants to provide advantageous properties to the optical amplifiers 10A-10C of FIGS. 1A-1C. In particular, if the N optical cores $26_1$-$26_N$ of the multi-core optical doped-amplifier fiber 16 are arranged in such special lateral patterns, the applicants believe that end-coupling the multi-core optical doped-amplifier fiber 16 to the input and/or output MMFs 12, 14 may, e.g., be possible with a low opticalpropagation-mode dependency in the resulting gain of the optical fiber amplifier 10A-10C.

For example, if the input and output MMFs 12, and 14 have low optical core-cladding contrasts, i.e., in the optical refractive index, the special lateral patterns A, B, C, D, E, and F are believed to be advantageous for end-coupling the multi-core optical doped-amplifier fiber 16 to the following respective sets of LP optical propagating modes:

$\{LP_{01}, LP_{11}x, LP_{11}y\}$, i.e., a set of 3 LP modes;
$\{LP_{01}, LP_{02}, LP_{11}x, LP_{11}y, LP_{21}x, LP_{21}y\}$, i.e., a set of 6 LP modes;
$\{LP_{01}, LP_{02}, LP_{11}x, LP_{11}y, LP_{21}x, LP_{21}y, LP_{31}x, LP_{31}y\}$, i.e., a set of 8 LP modes;
$(LP_{01}, LP_{02}, LP_{11}x, LP_{11}y, LP_{21}x, LP_{21}y, LP_{31}x, LP_{31}y, LP_{12}x, LP_{12}y)$, i.e., a set of 10 LP modes,
$(LP_{01}, LP_{02}, LP_{11}x, LP_{11}y, LP_{21}x, LP_{21}y, LP_{31}x, LP_{31}y, LP_{41}x, LP_{41}y, LP_{12}x, LP_{12}y)$, i.e., a set of 12 LP modes, and
$(LP_{01}, LP_{02}, LP_{03}, LP_{11}x, LP_{11}y, LP_{21}x, LP_{21}y, LP_{31}x, LP_{31}y, LP_{41}x, LP_{41}y, LP_{12}x, LP_{12}y, LP_{22}x, LP_{22}y\}$, i.e., a set of 15 LP modes, respectively.

As these examples illustrate, the number N of optical cores $26_1$-$26_N$ of the multi-core optical doped-amplifier fiber 16 may correspond to the number of LP modes of the end-coupled MMF(s) 12, 14, for which light is being optically amplified.

Figure 5A:
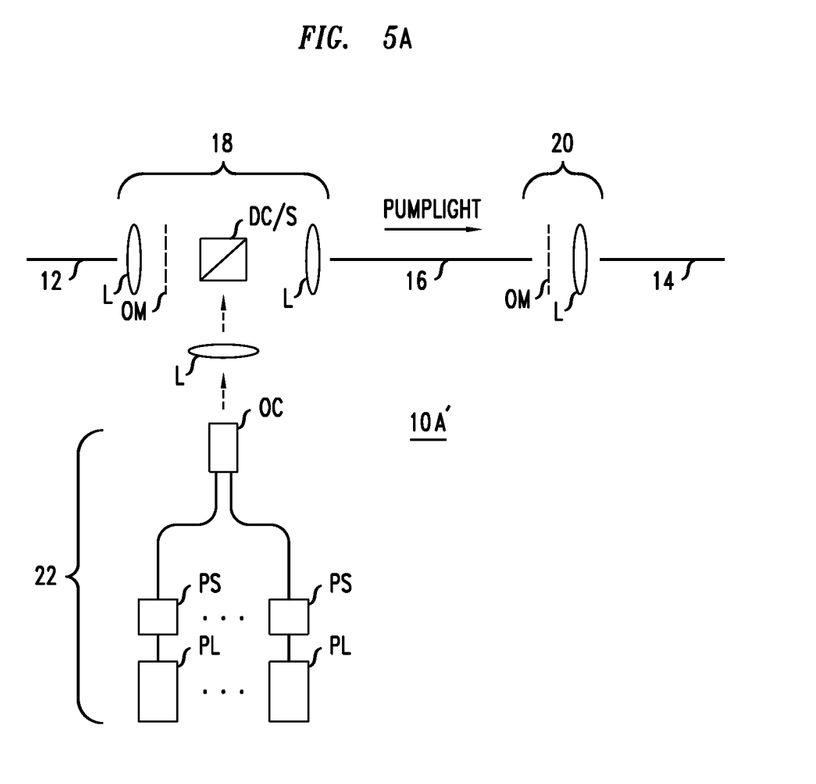
FIGS. 5A, 5B, and 5C are block diagrams that schematically illustrate specific embodiments of the all-optical amplifiers of FIGS. 1A, 1B, and 1C, respectively.
Figure 5B:
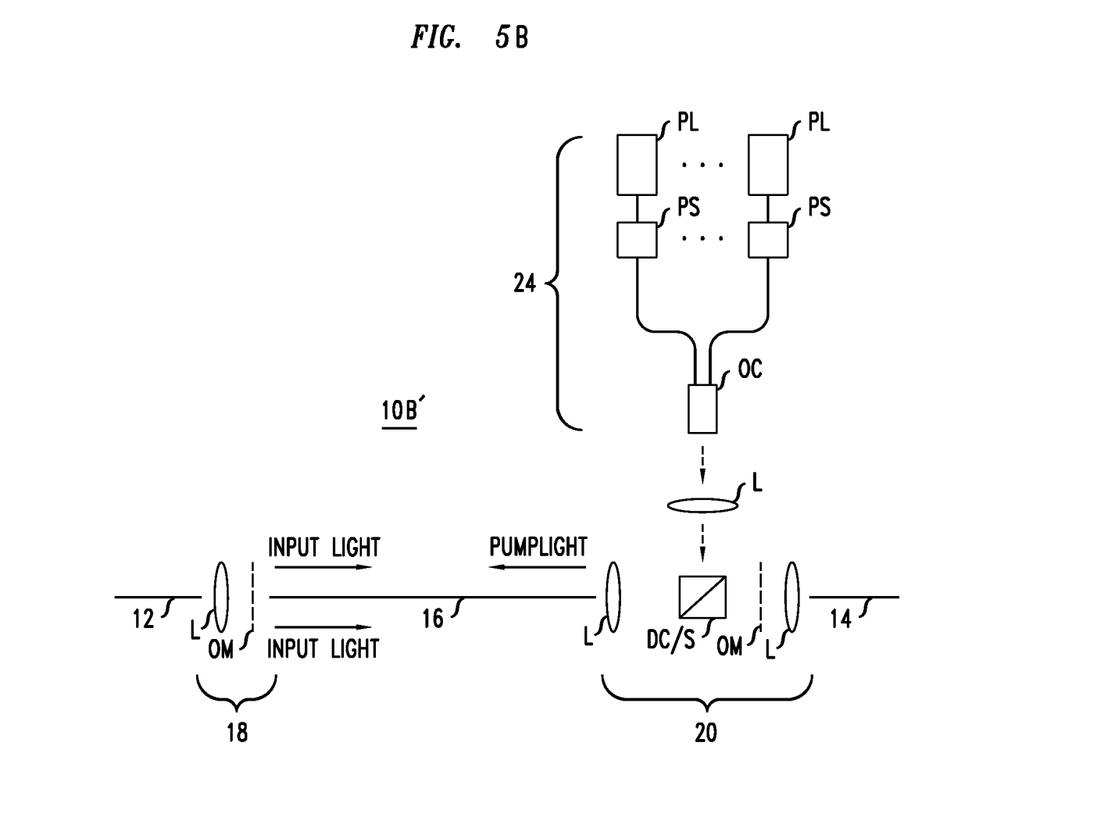
Figure 5C:
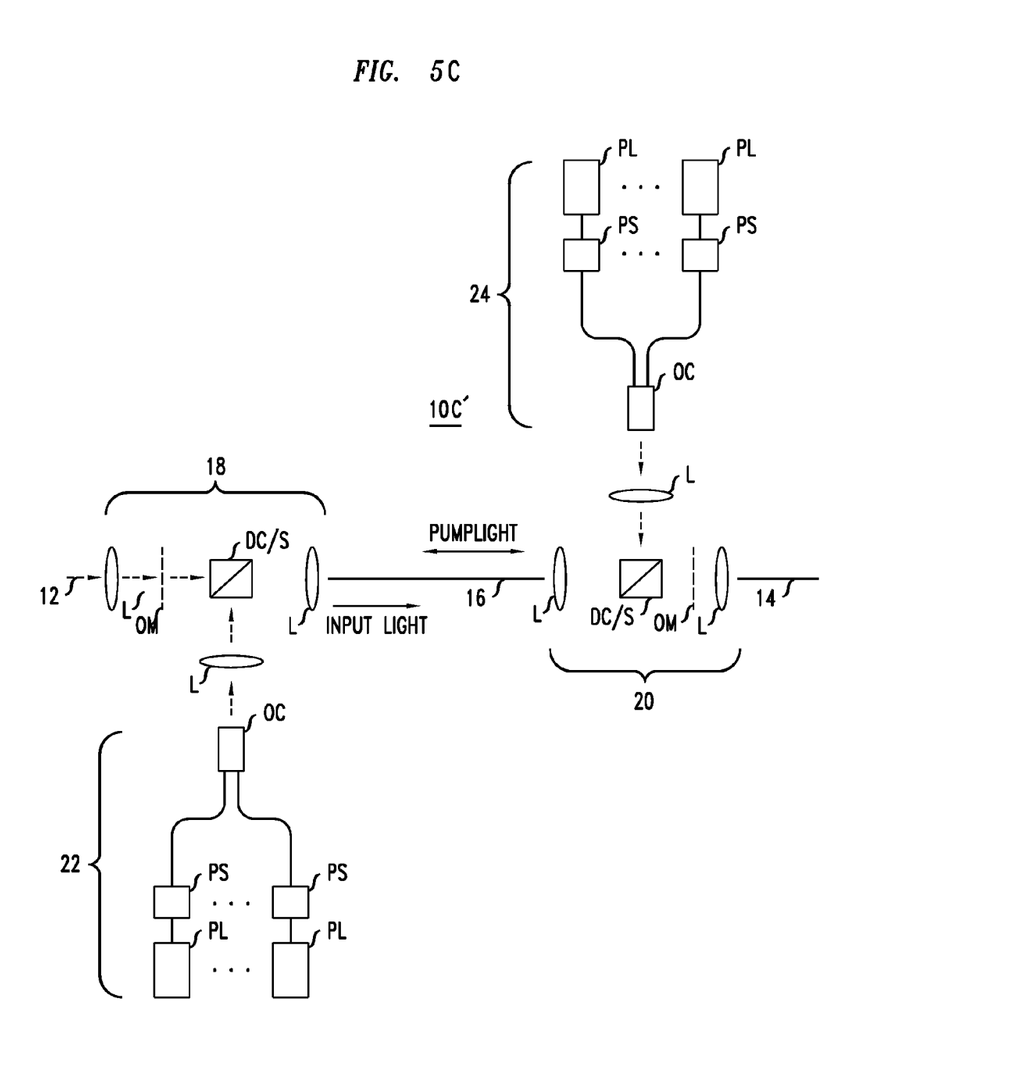

FIGS. 5A, 5B, and 5C illustrate specific embodiments 10A', 10B', and 10C' of the respective all-optical amplifiers 10A, 10B, and 10C of FIGS. 1A, 1B, and 1C. The all-optical amplifiers 10A'-10C' include special embodiments of the first and second optical couplers 18, 20 and one or both of the pump light source(s) 22, 24 as shown in FIGS. 1A-1C.

In FIGS. 5A-5C, the first and second optical couplers 18, 20 may optionally include one or more lens systems (L) that function to collimate and/or image light received from the MMF(s) 12, 14, multi-core optical amplifier fiber 16, and/or the pump light sources 22, 24. Such imaging may more efficiently align illumination beams of light from the input MMF 12 and/or pump light from the pump source(s) with the optical cores $26_1$-$26_N$ of the multi-core optical amplifier fiber 16.

In FIGS. 5A-5C, one or more of the first and second optical couplers 18, 20 may optionally include an optical mask (OM) that is configured to equalize the overall gain of the optical fiber amplifier 10A'-10C'. Such optical mask(s) OM may provide spatially varying phase and/or amplitude filtering of an incident light beam. The filtering may be configured to attenuate incident light in a manner that depends nontrivially on the light's optical propagating mode in the input or output multi-mode optical fiber 12, 14 whose end-face is adjacent to the optical mask OM. This mode-dependent attenuation may be produced in the optical mask OM itself or may be produced at or in one of the optical fibers 16, 14 receiving light processed by the optical mask OM, e.g., due to destructive optical interference.

In some embodiments of one or both of the optical couplers 18, 20, the optional optical mask(s) OM may include one or more wavelength-dependent filters. For example, the spectral dependency of such a filter may be used to provide spectral gain flattening.

In some embodiments of one or both of the optical couplers 18, 20 may also include an optical isolator. For example, such optical isolator(s) may be located in the optical free space path between the input and/or output MMF(s) 12, 14 and a dichroic combiner or splitter (DC/S) of the adjacent optical coupler 18, 20, and/or an optical isolator may be located in the optical free space path between the input or output MMF 12, 14 and the nearby end of the multi-core optical amplifier fiber 16.

In FIGS. 5A-5C, some of the first and second optical couplers 18, 20 may include a 2×1 all-optical coupler configured to receive light output by a nearby one of the optical pumps 22, 24 and light output by a nearby end-face of the input MMF 12 or the multi-core optical amplifier fiber 16. Such a 2×1 optical coupler may be a conventionally known 2×1 optical coupler, e.g., a 2×1 optical power coupler (OC) or a dichroic optical combiner or separator (DC/S).

In FIGS. 5A-5C, the forward and/or backward directed pump light source(s) 22, 24 may include a polarization scrambler(s) and pump laser(s). Such polarization scrambler(s) PS may randomize the polarization of light received from the corresponding pump laser(s) PL so that pump light more efficiently excites rare-earth dopant atoms in the multi-core optical amplifier fiber 16, e.g., to reduce polarization dependencies. Such a polarization scrambler PS may, e.g., combine light emitted at different times by the corresponding pump laser PL, e.g., light emitted at times separated by more than the temporal coherence time of said pump laser.

In FIGS. 5A-5C, the forward and/or backward directed pump light source(s) 22, 24 may include multiple laser sources whose output light beams are spatially combined by an optical coupler (OC), e.g., a fiber bundle, to form a pump light beam with a nontrivial cross section. In particular, the pump light beams may be combined so that the nearby optical coupler 18, 20 forms a special spot pattern of pump light on the nearby end-face of the multi-core optical amplifier fiber 16. Such a special spot pattern may be configured so that the pump light preferentially illuminates the end-faces of one, more than one, or all of N optical cores of the multi-core optical amplifier fiber 16. Such a spatial distribution of pump illumination on the end-face of the multi-core optical amplifier fiber 16 via may increase pumping efficiency in embodiments in which rare-earth dopant atoms are preferentially distributed in and/or adjacent to the optical cores $26_1$-$26_N$ therein. In some such embodiments, it may be unnecessary to illuminate the end-faces of all N of the optical cores $26_1$-$26_N$, because, the optical cores $26_1$-$26_N$ the multi-core optical amplifier fiber 16 are substantially optically coupled.

Figure 6:
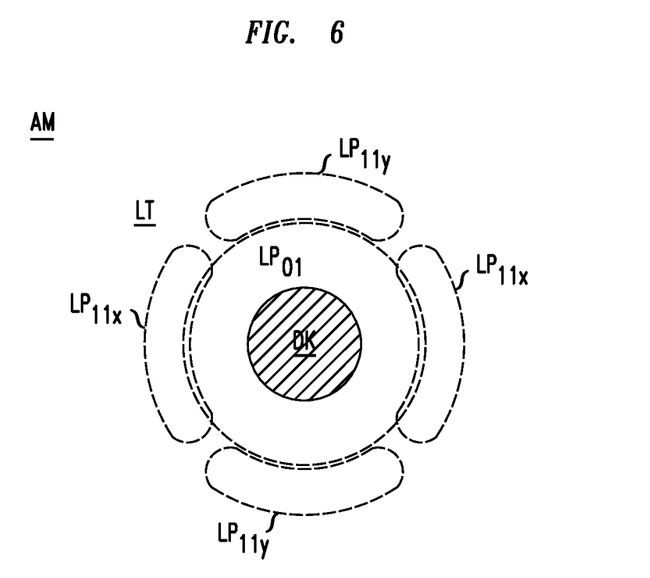
FIG. 6 is a face view illustrating an optical attenuator that can be used to mode-equalize in one example of the all-optical amplifiers of FIGS. 5A-5C in which light of $LP_{01}$, $LP_{11}x$, and $LP_{11}x$ optical propagating modes are amplified.

FIG. 6 illustrates an example of an optical attenuator mask (AM) useable to optically mode-equalize in embodiments of the all-optical amplifiers 10A'-10C'; of FIGS. 5A-5C in which light of $LP_{01}$, $LP_{11}x$, and $LP_{11}x$ optical propagating modes is amplified. The optical attenuator mask has two disjoint regions, i.e., a DK region and an LT region. In FIG. 6, the DK region is a disk-like region indicated by cross-hatching, and the LT region is the remainder of the face of the optical attenuator mask AM.

In FIG. 6, dashed regions indicate areas where the respective $LP_{01}$, $LP_{11}x$, and $LP_{11}x$ optical propagating modes have substantial light intensities on the input face of the optical attenuator AM. For these 3 LP modes, the regions of substantial light intensities overlap the DK and LT regions of the optical attenuator mask AM very differently. For example, only the $LP_{01}$ optical propagating mode has a substantial overlap with the DK region.

In one embodiment, the optical attenuator mask AM is a spatially varying amplitude mask for which the DK region provides strong optical attenuation and the LT region provides a relatively much weaker optical attenuation. Since only the $LP_{01}$ optical propagating mode has a substantial light intensity on the DK region, this example of the optical attenuator mask will provide a mode equalization in which the intensity of the $LP_{01}$ optical propagating mode is attenuated with respect to that of the two $LP_{11}$ optical propagating modes.

In an alternate embodiment, the optical attenuator mask AM is a spatially varying phase mask for which the DK region and the LT region provide phase modulations that differ by a relative phase of about 180 degrees. Since only the $LP_{01}$ optical propagating mode has a substantial intensity on the DK region, this example of the optical attenuator mask will again provide a mode equalization in which the intensity of the $LP_{01}$ optical propagating mode is attenuated with respect to that of the two $LP_{11}$ optical propagating modes. In particular, interference of light of the $LP_{01}$ optical propagating mode, which has been transmitted through the optical attenuator mask AM, will be significantly destructive. For example, such interference may occur in the multi-core optical amplifier fiber 16 or in the output MMF 14 of FIGS. 5A-5C, e.g., depending on the location of the optical attenuator mask AM. On the other hand, such interference should not significantly attenuate light of the $LP_{11}$ optical propagating modes, because such light only substantially passes through the LT region of the optical attenuator mask AM.

Figure 7:
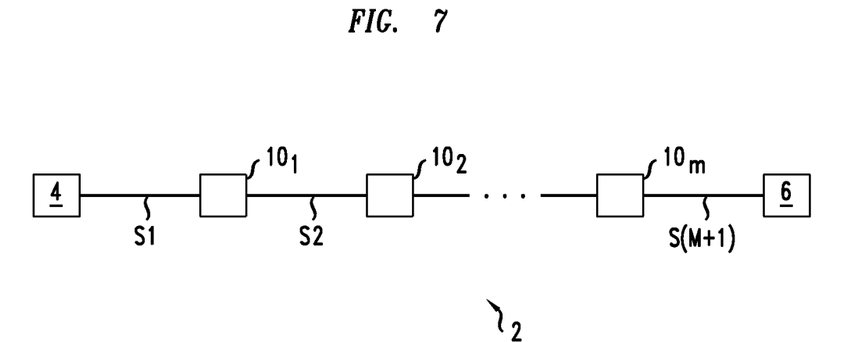
FIG. 7 is a block diagram illustrating an all-optical communication system having spans of transmission MMF and one or more all-optical amplifiers, e.g., one or more of the all-optical amplifier(s) according to FIGS. 1A-1C and 2.

FIG. 7 illustrates an all-optical communication system 2 having (M+1) spans S1, S2, . . . , S(M+1) of transmission MMF; one or more all-optical end-connectors $10_1$, $10_2$, . . . $10_M$; an optical data transmitter 4, which converts electrical data stream(s) to optical data streams(s); and an optical data receiver 6, which converts optical data stream(s) to electrical data streams(s). In various embodiments the integer M may be 1 or may be greater than 1. The spans S1-S(M+1) may be, e.g., spans of the same type of MMF, e.g., MMFs propagating approximately the same set of optical propagating modes. The spans SP1-SP(M+1) are end-connected together to form an all-optical fiber transmission line between the optical data transmitter 4 and receiver 6 via all-optical end-connectors $10_1$, $10_2$, . . . $10_M$. One or more of the optical end connectors $10_1$-$10_M$ include all-optical fiber amplifier(s) 10A-10C as illustrated in FIGS. 1A-1C and 2. For example, said all-optical amplifiers may end-connect to the end-faces of the pair of adjacent spans of MMF.

Figure 8:
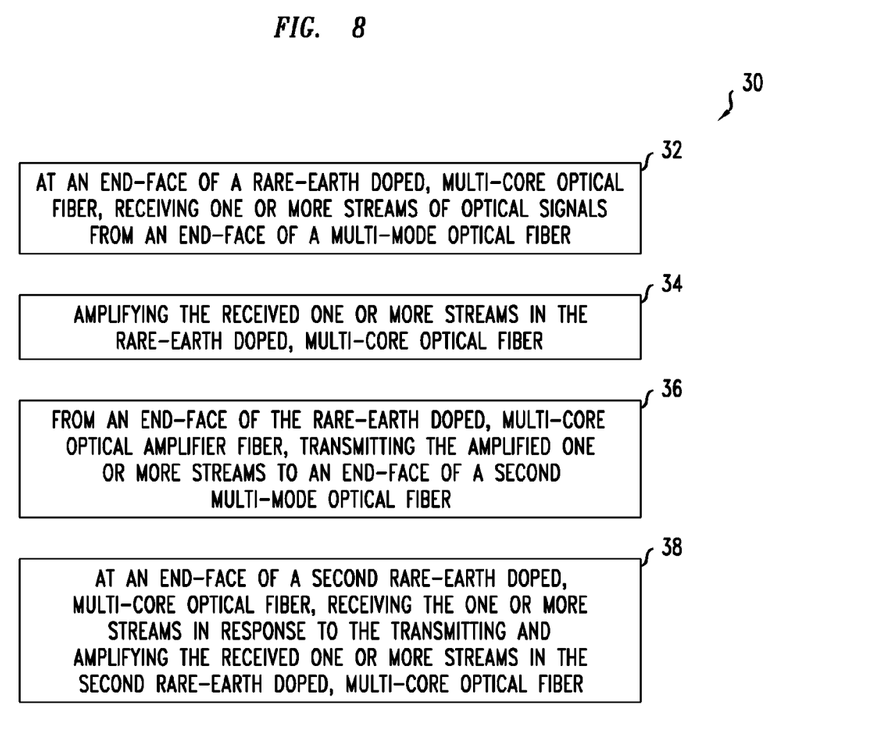
FIG. 8 is a flow chart schematically illustrating a method of operating an optical amplifier for optical signal streams in multiple optical propagating modes, e.g., a method of operating the optical amplifiers schematically illustrated in FIGS. 1A-1C and 2.

FIG. 8 schematically illustrates a method 30 for operating an all-optical fiber amplifier to amplify one or more parallel streams of optical signal being carried by multiple optical propagating modes of multi-mode optical fiber(s). The 30 method may be used to operate any of the all-optical amplifier(s) 10A-10C, 10A'-10C' of FIGS. 1A-1C, 2, and 5A-5C.

The method 30 includes, at an end-face of a rare-earth doped, multi-core optical fiber, e.g., the multi-core optical amplifier fiber 16 of FIGS. 1A-1C, receiving the one or more streams of optical signals from an end-face of a multi-mode optical fiber, e.g., the input MMF 12 of FIGS. 1A-1C and 5A-5C (step 32). The one or more streams typically include optical data modulated carrier(s) that are carried via a set of optical propagation modes of the recited multimode optical fiber. The set of optical propagation modes may carry optical signals in one wavelength band or may carry optical signals in a sequence of non-overlapping wavelength bands, e.g., to implement wavelength division multiplexing. The different optical propagation modes of the set have optical intensity and/or phase cross-sectional profiles, which are non-trivially different. In particular, the set includes optical propagating modes that are relatively orthogonal modes of the MMF. Some of the optical propagating modes of the set have non-trivially different lateral intensity profiles, i.e., differing by more than a scale transformation, and/or different angular momentum eigenvalues.

The method 30 includes amplifying the received one or more streams of optical signals in the rare-earth-doped, multi-core optical fiber (step 34). Typically, the amplifying includes optically pumping the multi-core optical fiber with one or more pump light sources, e.g., the forward pumping light source 22 and/or the backwards pumping light source 24 of FIGS. 1A-1C and 5A-5C.

In some embodiments, the method 30 may further include, from an end-face of the rare-earth doped, multi-core optical amplifier fiber, transmitting the amplified one or more streams of optical signals to an end-face of a second multi-mode optical fiber, e.g., the MMF 14 of FIGS. 1A-1C and 5A-5C (step 36). The transmitting may occur from a different second end-face of the multi-core optical amplifier fiber, e.g., as illustrated in FIGS. 1A-1C and 5A-5C. Alternatively, the transmitting may occur from the same input end-face of the rare-earth doped, multi-core optical amplifier fiber that received light of the one or more streams in the step 32, i.e., a configuration not shown in FIGS. 1A-1C. In such an embodiment, the second end-face of the rare-earth doped, multi-core optical amplifier fiber may be oriented to face a nearby minor, which sends amplified light back into the same rare-earth doped, multi-core optical amplifier fiber. The, such amplified light may be further amplified and finally extracted from the original input end-face of said same multi-core optical amplifier fiber by an optical circulator, which sends said amplified light to the end-face of an output multi-mode optical fiber of the step 36.

In such embodiments, the method 30 may also include, at an end-face of a second rare-earth doped multi-core optical fiber, receiving the one or more streams of optical signals via the second multi-mode optical fiber in response to the transmitting and amplifying the received one or more streams of optical signals in the second rare-earth-doped, multi-core optical amplifier fiber (step 38). For example, the second rare-earth doped, multi-core optical fiber, which is acting in the step 38, may be located in a different all-optical end connector 101-10M of FIG. 7 than the first rare-earth doped, multi-core optical fiber, which is acting in the steps 32-34.

In some embodiments, the method may further include optically attenuating light being communicated between the rare-earth dopes multi-core optical fiber(s) and one of the multi-mode optical fibers in a manner that nontrivially adjusts intensity based on an optical propagating mode of the light in the one of the multi-mode optical fibers.

In various methods described and/or recited in this application, various steps of methods may be performed in a sequential manner, a parallel manner, or in a partially parallel manner.

Herein, properties of various embodiments have been described with respect to data communications on a single wavelength band, e.g., supporting data-modulated optical carriers on a set of optical propagation modes of transmission span(s) of MMF. These embodiments include are meant to include examples where a sequence of overlapping wavelength bands support data-modulated optical carriers, e.g., via wavelength division multiplexing (WDM). In such examples, one or more optical propagation modes of the set of optical propagation modes may carry separate data-modulated optical carriers on the non-overlapping wavelength bands of the sequence.

Various embodiments of the optical amplifiers and the optical communication systems with optical amplifier(s), which are described herein, may include additional conventional optical components. The additional conventional optical components may include, e.g., optical isolator(s) and/or optical gain flattening filter(s), which remove or alter wavelength dependencies of transmission properties. These additional optical components may be placed in the embodiments of optical amplifiers and/or the embodiments of all-optical transmission lines in manners that would be easily understood by persons of ordinary skill in the art in light of teachings of this application. Such conventional optical components may be deployed in a manner similar to the deployment of such optical components in optical amplifiers and/or all-optical transmission lines based on single-mode optical fiber.

The invention is intended to include other embodiments that would be obvious to one of skill in the art in light of the description, figures, and claims.

What we claim is:

1. An apparatus comprising:
   a multi-core optical fiber being rare-earth doped to provide optical amplification in response to optical pumping thereof;
   a first optical coupler configured to end-couple a first multi-mode optical fiber to an end of the multi-core optical fiber, wherein a number of cores of the multi-core optical fiber is equal to a number of modes of the first multi-mode optical fiber;
   a second optical coupler configured to end-couple a second multi-mode optical fiber to an end of the multi-core optical fiber; and
   a third optical coupler configured to optically couple one or more pump light sources to the multi-core optical fiber.

2. The apparatus of claim 1, further comprising one or more pump lasers optically being connected to the third optical coupler and configured to produce optical amplification in the multi-core optical fiber.

3. The apparatus of claim 2, wherein the third optical coupler is configured to couple an adjacent end face of each optical core of the multi-core optical fiber to a corresponding source of pump light.

4. The apparatus of claim 1, wherein the third optical coupler is configured to preferentially transmit pump light from the one or more pump lasers to a proper subset of nearby end-faces of the optical cores of the multi-core optical fiber.

5. The apparatus of claim 2, further comprising a polarization scrambler connected between the one or more optical pumps and the multi-core optical fiber.

6. An apparatus comprising:
   a multi-core optical fiber being rare-earth doped to provide optical amplification in response to optical pumping thereof;
   a first optical coupler configured to end-couple a first multi-mode optical fiber to an end of the multi-core optical fiber;
   a second optical coupler configured to end-couple a second multi-mode optical fiber to an end of the multi-core optical fiber;
   a third optical coupler configured to optically couple one or more pump light sources to the multi-core optical fiber; and
   an optical attenuator being configured to adjust an intensity of light being transmitted between adjacent ends of the multi-core optical fiber and one of the multi-mode optical fibers in a manner non-trivially dependent on an optical propagating mode of the light in the one of the multi-mode optical fibers.

7. The apparatus of claim 1, wherein the multi-core optical fiber is a three-core optical fiber in which three optical cores are about equidistant from each other.

8. An apparatus comprising:
   a multi-core optical fiber being rare-earth doped to provide optical amplification in response to optical pumping thereof, wherein the multi-core optical fiber has disjoint first and second sets of optical cores, the first set being formed of one or more optical cores, the second set being formed of an odd number of optical cores being distributed on a circle and being located around the first set;
   a first optical coupler configured to end-couple a first multi-mode optical fiber to an end of the multi-core optical fiber;
   a second optical coupler configured to end-couple a second multi-mode optical fiber to an end of the multi-core optical fiber; and
   a third optical coupler configured to optically couple one or more pump light sources to the multi-core optical fiber.

9. An apparatus comprising:
   a series of spans of multi-mode optical fiber end-connected to form an all-optical communication line;
   a plurality of all-optical amplifiers, each all-optical amplifier end-connecting a corresponding adjacent pair of the spans; and
   wherein each all-optical amplifier includes a multi-core optical fiber doped with a rare-earth element to provide optical amplification in response to being optically pumped, wherein a number of cores in the multi-core optical fiber is equal to a number of modes of the multi-mode optical fiber.

10. The apparatus of claim 9, wherein each adjacent pair of the spans is end-connected by one of the all-optical amplifiers.

11. The apparatus of claim 9, wherein individual ones of the all-optical amplifiers include one or more optical pumps connected to optically pump the multi-core optical fibers therein.

12. The apparatus of claim 11, wherein one of the all-optical amplifiers includes a polarization scrambler connected between the one or more optical pumps and the multi-core optical fiber therein.

13. An apparatus comprising:
   a series of spans of multi-mode optical fiber end-connected to form an all-optical communication line; and
   a plurality of all-optical amplifiers, each all-optical amplifier end-connecting a corresponding adjacent pair of the spans, wherein each all-optical amplifier includes a multi-core optical fiber doped with a rare-earth element to provide optical amplification in response to being optically pumped, and wherein one of the all-optical amplifiers includes an optical attenuator configured to attenuate in a manner dependent on an optical propagation mode of the light in one of spans of the corresponding adjacent pair.

14. The apparatus of claim 9, wherein some of the multi-core optical fibers have three optical cores located about equidistant from each other.

15. An apparatus comprising:
   a series of spans of multi-mode optical fiber end-connected to form an all-optical communication line, wherein the individual multi-core optical fibers have disjoint first and second sets of optical cores, the first set being formed of one or more of the optical cores, the second set being formed of an odd number of the optical cores located on a circle and around the first set; and
   a plurality of all-optical amplifiers, each all-optical amplifier end-connecting a corresponding adjacent pair of the spans, and wherein each all-optical amplifier includes a multi-core optical fiber doped with a rare-earth element to provide optical amplification in response to being optically pumped.

16. A method, comprising:
at an end of a rare-earth doped multi-core optical fiber, receiving a stream of optical signals from a multi-mode optical fiber that has a number of modes equal to a number of cores of the multi-core optical fiber; and
amplifying the received stream of optical signals in the rare-earth-doped multi-core optical fiber.

17. The method of claim 16, further comprising:
from an end of the multi-core optical fiber, transmitting the amplified stream of optical signals to a second multi-mode optical fiber.

18. The method of claim 16, wherein the amplifying includes optically pumping the multi-core optical fiber with one or more pump lasers to produce optical amplification therein.

19. The method of claim 17, further comprising:
at an end of another rare-earth doped multi-core optical fiber, receiving a stream of optical signals from the another multi-mode optical fiber in response to the act of transmitting; and
amplifying the received stream of optical signals in the another rare-earth-doped multi-core optical fiber.

20. The method of claim 17, further comprising optically attenuating light being communicated between the multi-core optical fiber and one of the multi-mode optical fibers in a manner that nontrivially adjusts intensity based on an optical propagating mode of the light in the one of the multi-mode optical fibers.

21. An apparatus comprising:
a multi-core optical fiber being rare-earth doped to provide optical amplification in response to optical pumping thereof, wherein the multi-core optical fiber comprises a plurality of optical cores;
a first optical coupler to end-couple a first multi-mode optical fiber to an end of the multi-core optical fiber such that light conveyed by the first multi-mode optical fiber illuminates end-faces of the plurality of optical cores; and
a third optical coupler configured to optically couple one or more pump light sources to the multi-core optical fiber such that pump light illuminates the end-faces of a subset of the plurality of optical cores.

22. The apparatus of claim 21, wherein the plurality of optical cores comprise disjoint first and second sets of optical cores, the first set being formed of one or more optical cores, the second set being formed of an odd number of optical cores being distributed on a circle and being located around the first set.

23. The apparatus of claim 21, wherein a total number of the plurality of optical cores is equal to a number of modes of the first multi-mode optical fiber.

24. The apparatus of claim 21, further comprising:
an optical attenuator to adjust an intensity of light being transmitted between adjacent ends of the multi-core optical fiber and the first multi-mode optical fiber in a manner non-trivially dependent on an optical propagating mode of the light in the one of the multi-mode optical fibers.

25. A method, comprising:
receiving a stream of optical signals from a multi-mode optical fiber that illuminate end-faces of a plurality of optical cores of a rare-earth doped multi-core optical fiber; and
optically pumping a subset of the plurality of optical cores of the multi-core optical fiber with one or more pump lasers to produce optical amplification therein.

26. The method of claim 25, further comprising:
optically attenuating light being communicated between the multi-mode optical fiber and the plurality of optical cores of the rare-earth doped multi-core optical fiber in a manner that nontrivially adjusts intensity based on an optical propagating mode of the light in the multi-mode optical fiber.

* * * * *